(12) United States Patent
Habhab

(10) Patent No.: US 9,308,948 B1
(45) Date of Patent: Apr. 12, 2016

(54) SEMI TRACTOR CAB LIVING QUARTERS

(71) Applicant: William Junior Habhab, Humboldt, IA (US)

(72) Inventor: William Junior Habhab, Humboldt, IA (US)

( * ) Notice: Subject to any disclaimer, the term of this patent is extended or adjusted under 35 U.S.C. 154(b) by 0 days.

(21) Appl. No.: 14/610,629

(22) Filed: Jan. 30, 2015

(51) Int. Cl.
*B62D 33/06* (2006.01)
*B62D 33/08* (2006.01)

(52) U.S. Cl.
CPC ............ *B62D 33/0612* (2013.01); *B62D 33/08* (2013.01)

(58) Field of Classification Search
CPC ........ B62D 33/0612; B62D 33/08; B60P 3/34
USPC .......................... 296/24.3, 26.08, 190.02, 165
See application file for complete search history.

(56) References Cited

U.S. PATENT DOCUMENTS

| | | | | |
|---|---|---|---|---|
| 4,201,415 A * | 5/1980 | Suchanek | ................. | 296/190.02 |
| 5,083,834 A | 1/1992 | Moffatt et al. | | |
| 5,658,038 A * | 8/1997 | Griffin | ................. | B62D 35/001 |
| | | | | 296/180.1 |
| 6,213,531 B1 * | 4/2001 | Corey | ....................... | B60P 3/34 |
| | | | | 296/190.02 |
| 6,692,062 B1 | 2/2004 | Woodard et al. | | |
| 7,159,915 B2 * | 1/2007 | Corey et al. | .................. | 296/24.3 |
| 7,232,179 B1 * | 6/2007 | Racz | .................. | B62D 33/0612 |
| | | | | 296/190.02 |
| 7,494,823 B2 * | 2/2009 | Sukumar | ....................... | 436/174 |
| 7,971,918 B2 * | 7/2011 | Oriet | .................. | B62D 33/0612 |
| | | | | 296/180.2 |
| 2004/0178663 A1 * | 9/2004 | Whelan | .............. | B62D 33/0612 |
| | | | | 296/190.02 |
| 2006/0226669 A1 * | 10/2006 | Tong et al. | .................... | 296/24.3 |
| 2011/0057475 A1 * | 3/2011 | Cunningham | ................ | 296/165 |
| 2013/0221696 A1 * | 8/2013 | Quattrocolo et al. | ........ | 296/24.3 |

OTHER PUBLICATIONS

Slide-Out Cabs Offer Space: Go by Truck Global News, www.gobytrucknews.com/slide-out-cabs-offer-space/123, Mar. 7, 2014, Go by Truck News.

* cited by examiner

*Primary Examiner* — Pinel Romain
(74) *Attorney, Agent, or Firm* — Zarley Law Firm, P.L.C.

(57) ABSTRACT

The present invention relates to a semi-tractor living quarters. The living quarters includes a roof, floor, rear wall, and first and second side walls. The walls of the livings quarters are connected to actuation members that allow any combination of the first side wall, second side wall, and the rear wall to extend outward from the cab to increase the available space within the cab. Positioned within the cab are a plurality of appliances and a bed.

20 Claims, 3 Drawing Sheets

SEMI TRACTOR CAB LIVING QUARTERS

BACKGROUND OF THE INVENTION

This invention is directed toward a semi-tractor cab. More specifically, and without limitation, this invention relates to a semi-tractor cab living quarters with amenities including a sleeper, a refrigerator, a microwave, a shower, and a septic.

Semi tractors are commonly used to transport freight long distances throughout the world. Covering these long distances normally requires days spent on the road travelling from destination to destination. Often times, deliveries must arrive within a very short period of time thereby requiring that as much time as possible is spent on the road in order to reach the intended destination on time. To accommodate these long distances it is conventional for a cab within the semi-tractor to include a bed for the driver to use in order to quickly pull over and rest before continuing on the road. The use of these beds also reduces the expense incurred by the driver as they do not need to find a hotel each day they are travelling.

Although having beds within a cab reduces down time and cost, current semi-tractor cabs suffer from a number of deficiencies. Specifically, drivers must still stop at truck stops to use shower systems and bathrooms to maintain their hygiene. Stopping at these locations, however, takes the drivers off route, wasting valuable time. Further, the accommodations at truck stops typically include a fee, such as tokens used for showers and the like.

Further, the currently available cab beds take up a substantial amount of space. As such, the majority of the cab behind the driver and passenger seats is used by the bed that juts out from the rear of the semi-tractor cab. The cramped cab space makes rest difficult, which in turn hinders the driver from resting. Drivers that are not well rested, in turn, present a hazard to other drivers and themselves given their lack of rest.

Additionally, in order to eat and drink drivers must stop off at gas stations, truck stops, or restaurants to purchase food and drinks. This again takes away from time on the road and requires additional money be spent at these locations that often have prices that are substantially higher than that of a typical grocer.

To address this, drivers may attempt to purchase freestanding refrigerators or microwaves so that food can be stored or heated. These free-standing appliances present a significant danger to drivers as they can tip over while turning or become airborne in the event of a crash or harsh road conditions. Other approaches to providing these amenities require the addition of a coach to the tractor-trailer, making it impossible to carry a trailer to hold freight and as such are impractical. Therefore there exists a need in the art that addresses these problems.

Thus it is a primary object of the invention to provide a semi-tractor cab living quarters that improves upon the state of the art.

Another object of the invention is to provide a semi-tractor living quarters that reduces down time during freight transport.

Yet another object of the invention is to provide a semi-tractor living quarters that reduces costs during freight.

Another object of the invention is to provide a semi-tractor living quarters that maximizes cab space.

Yet another object of the invention is to provide a semi-tractor living quarters that increases safety of drivers.

Another object of the invention is to provide a semi-tractor living quarters that is durable.

Yet another object of the invention is to provide a semi-tractor living quarters that is easy to use.

These and other objects, feature, or advantages of the invention will become more apparent from the specification, drawings, and claims.

SUMMARY OF THE INVENTION

Figure 1:
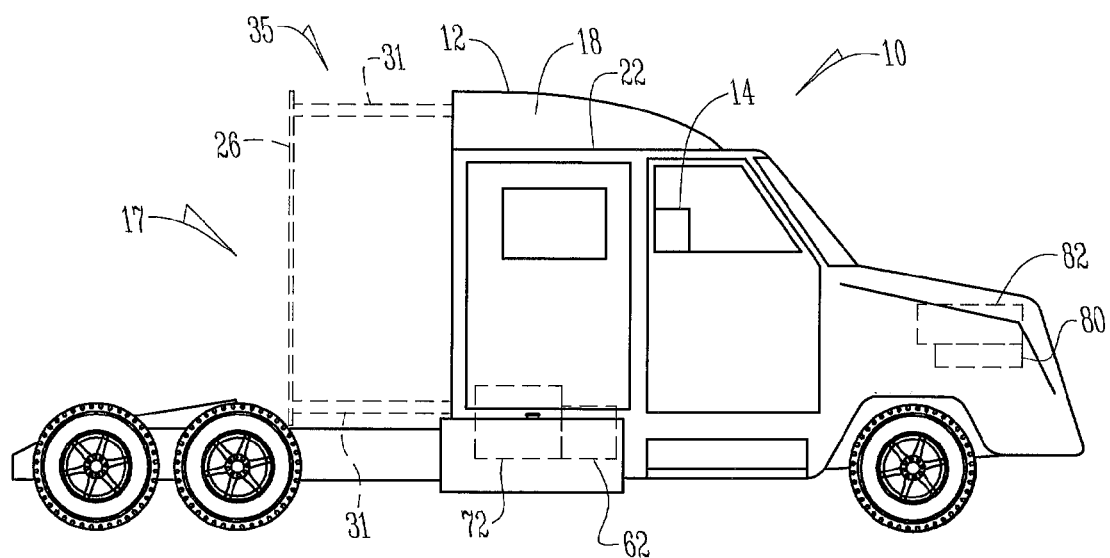
FIG. 1 is a side view of a semi-tractor cab living quarters.
Figure 2:
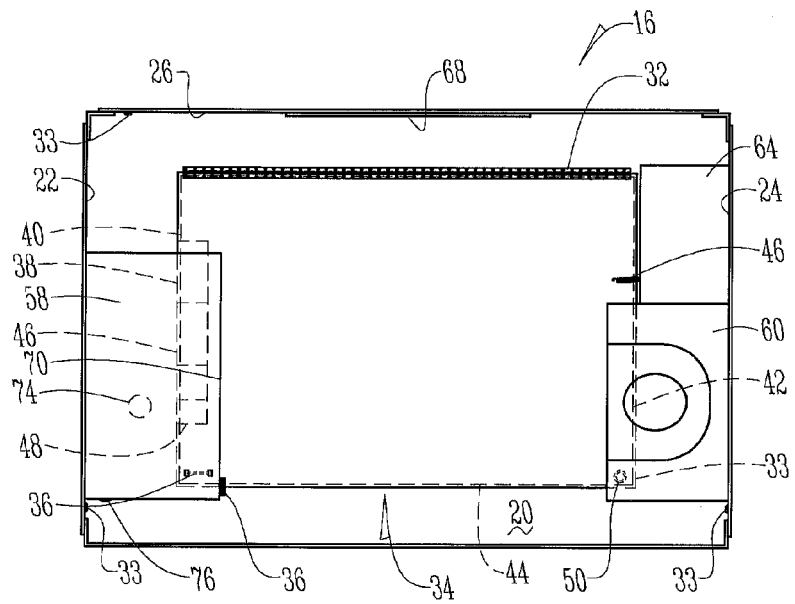
FIG. 2 is a perspective view of a semi-tractor cab living quarters.
Figure 3:
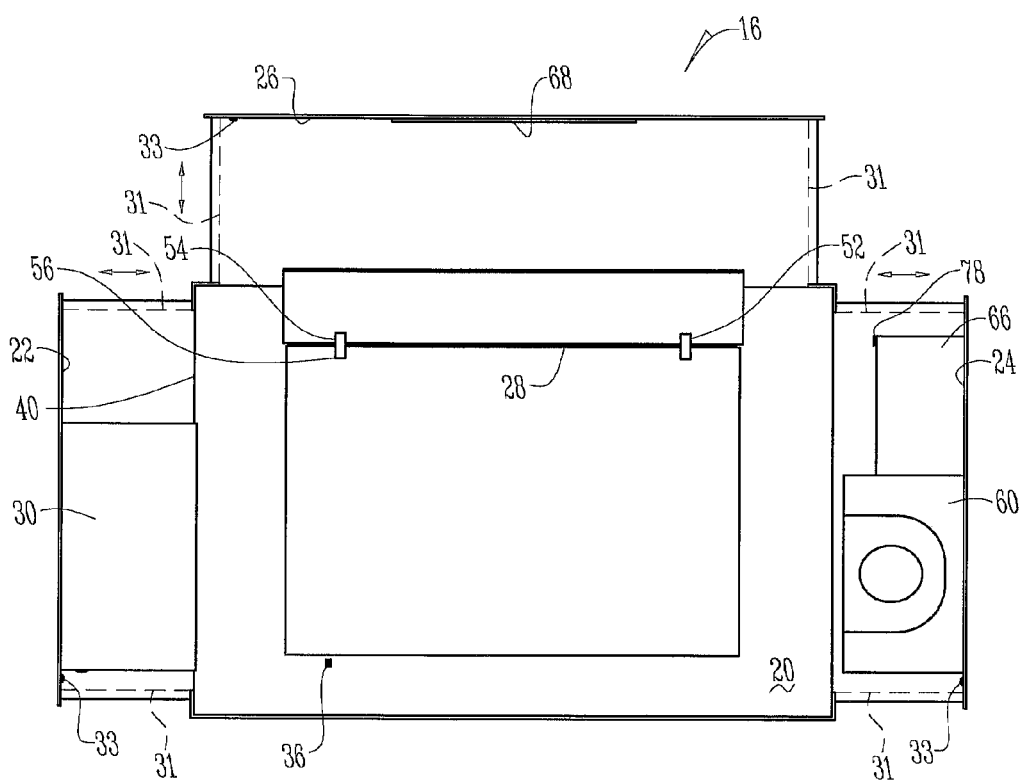
FIG. 3 is a perspective view of a semi-tractor cab living quarters.
Figure 4:
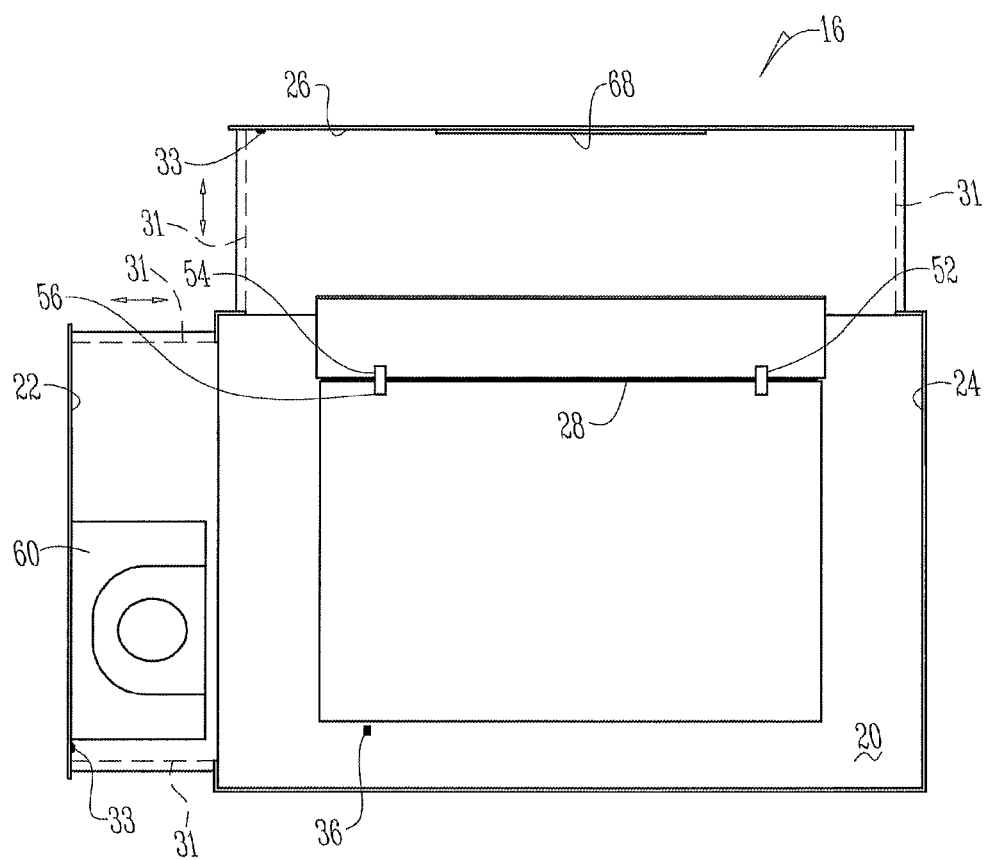
FIG. 4 is a perspective view of a semi-tractor cab living quarters.

In general, the present invention relates to a semi-tractor living quarters. The living quarters includes a roof, floor, rear wall, and first and second side walls. The moveable walls of the livings quarters are connected to actuation members that allow any combination of the first side wall, second side wall, and the rear wall to move outward from the cab to increase the available space within the cab.

In one embodiment, within the floor of the cab is a hatch that is covered by a door. Stored within the hatch is a bed that can be stored when not in use and removed when in use.

In some arrangements of the present invention the beds are connected to the rear wall of the cab such that they can be raised to a vertical position when stored and dropped down to a horizontal position when in use.

In addition to the bed, some embodiments of the present invention include appliances mounted within the cab. These appliances include a shower, a toilet, a septic, a refrigerator, a microwave, and a television as well as any other appliance. In one embodiment the appliances are mounted such that when a wall is actuated to extend the cab, the appliance stays mounted to the wall and travels with the wall. Other features of the invention include an electrical system with additional batteries, restriction members, and safety locks.

DETAILED DESCRIPTION

Referring to the figures, a semi-tractor cab livings quarters 10 is disclosed and comprised of a semi-tractor 12 having a pair of seats 14 and a cab 16 with moveable walls 17 that include a top or roof 18, a bottom or floor 20, a first side wall 22, a second side wall 24, and a rear wall 26. The cab 16 contains a bed 28 and a plurality of appliances 30. The semi-tractor 12 can be of any shape or size of a conventional semi-tractor 12 but may also have an elongated cab 16.

A plurality of actuating members 31 are connected to the first side wall 22, the second side wall 24, and the rear wall 26 such that the actuating members 31 can move one or more of the moveable walls 17 upon activation. In other arrangements the actuating members 31 are attached to the roof 18 and floor 20 as well. The plurality of actuating members 31 can be driven by hydraulics, electronics, or the like to extend the moveable walls 17 along a track system 35 or other system that maintains alignment of the moveable walls 17 and provides stability and rigidity. The actuating members 31 in one embodiment are in communication with a actuation button 33 that transitions the actuating members 31 from a retracted position to an expanded position.

In one embodiment, the floor 20 of the cab 16 includes a hatch door 32 that covers a hatch 34 disposed within the floor 20. The hatch door 32, in one embodiment, includes a latch or lock 36 to keep the hatch door 32 from moving while driving.

The hatch 34 can be of any shape or size, but in one arrangement is sized to contained a single bed 28, although in other embodiments the hatch 34 could be large enough to hold two or more beds.

Within the hatch 34 the bed 28 is stored when not in use. Attached to the bed 28 are a pair of hinges 38 attached to a first end 40 and a second end 42 of a frame 44 of the bed 28. In one embodiment, the pair of hinges 38 are connected to the frame 44 such that bed 28 can be placed in a folded position while stored in the hatch 34, but when removed the frame 44 opens and the bed 28 unfolds. In an alternative embodiment, the bed 28 is simply stored in the hatch 34 and is removed from the hatch 34 during use.

In an alternative embodiment, the pair of hinges 38 are attached to a spring or springs 46 that are positioned to pull the pair of hinges 38 apart. In this arrangement, a locking mechanism 48 is positioned within the hatch 34 to prevent the spring or springs 46 from pulling the pair of hinges 38 apart 40 when the bed 28 is being stored. Attached to the locking mechanism 48 is a release button 50 that releases the locking mechanism 48 from the spring or springs 46 to unfold the bed 28. In one arrangement the release button 50 is positioned on the first side wall 22 or the second side wall 24. Alternatively, the release button 50 can be positioned anywhere within the cab 16. In an alternative arrangement, the locking mechanism 48 is released by the latch 36 of the hatch door 32 or is in communication with the actuation button 33.

In another embodiment, the bed 28 is hingedly connected to the rear wall 26 at some point between the roof 18 and floor 20. In this embodiment the bed 28 is held in an upright position against the rear wall 26 by a restriction member 52. The restriction member 52 can be a rotatable L-shaped member that has a horizontal section 54 and a vertical section 56. When the bed in stored the restriction member 52 is positioned so that the horizontal section 54 extends beyond the length of the upright bed 28 so that the vertical section 56 can be rotated such that a portion of the bed 28 is held between the vertical section 56 and the rear wall 28, thereby preventing the bed from moving. When the bed 28 is used, the restriction member 52 is rotated so that the vertical section 56 no longer engages the bed 28.

In alternative embodiments, the restriction member 52 can be a series of straps, clamps, bars, or the like that are suitable to hold the bed 28 in position during travel. Further, in other embodiments additional beds 28 can be hingedly connected to the rear wall 26 such that the sides of the beds 28 are stacked when the beds 28 are stored.

In one embodiment the bed 28 is a fold-out couch. The bed 28 can be of any size such as full size, but in one embodiment the bed 28 is queen size when the fold-out is expanded.

The plurality of appliances 30 in one illustrative embodiment include a shower 58, a toilet 60, a septic 62, a refrigerator 64, a microwave 66, and a television 68. In one embodiment, the shower 58 is mounted on the first side wall 22 between the seats 14 and the bed 28. The shower 58 in one embodiment is made of fiberglass but can be made of any suitable material that is durable and safe during an accident, such as stainless steel or plexiglass. The shower has a door 70 to allow entry but prevent water from entering the cab 16. Connected to the shower 58 is a water reservoir 72 that holds and heats water for use in the shower 58. Also connected to the shower 58 is a drain 74 that is in communication with the septic 62. A exhaust system 76 is also attached to the shower 58 to allow steam to be removed from the shower 58.

A toilet 60 is mounted next to the shower 58. In one embodiment the toilet is positioned between the shower 58 and the bed 28. In another embodiment, the toilet 60 is positioned such that when the bed 28 is in use the toilet 60 is positioned below the bed 28 and is effectively covered by the bed 28. In yet another embodiment, the toilet 60 is positioned within the shower 58 such that the toilet 60 can be closed and used as a seat while the shower 58 is in use. The toilet 60 is made of fiberglass, but can be made of any suitable material such as stainless steel or plexiglass that is both durable and safe in the event of an accident. The toilet 60 is in communication with the septic 62 to transport waste water.

The refrigerator 64 and microwave 66 are mounted to the second side wall 24 between the seats 14 and bed 28. The refrigerator 64 and microwave 66 can be mounted anywhere on the second side wall 24, but in one embodiment are positioned near the roof 18 of the cab 28. The refrigerator 64 can be of any shape and size. The microwave 66 can be directly connected to or independent of the refrigerator 64. The refrigerator 64 and the microwave in one arrangement include safety locks 78 that keep the refrigerator and microwave shut while not in use.

The refrigerator 64 and the microwave 66 are connected to the semi-tractor electrical system 80. Both the refrigerator 64 and microwave 66 can be set to a standby mode where a minimal amount of power is pulled from the electrical system 80 so stored food is not spoiled, an active mode that increases power when in use, and an off mode where the refrigerator 64 and microwave 66 do not draw power from the electrical system 80. The refrigerator 64 and microwave 66 are connected to the electrical system 80 such that the semi-tractor 12 does not need to be running while in use. In one embodiment, the electrical system 80 includes additional batteries 82 to store additional electricity to power the refrigerator 64, microwave 66, and other appliances 30 and actuation members 31

The television 68 is mounted, in one embodiment, on the second side wall 24 and is of any suitable shape and size. Alternatively, the television 68 is mounted on the rear wall 26 or the roof 18. The television 68 is connected to the electrical system 80.

Although a number of appliances 30 have been described additional appliances 30 and amenities are contemplated, such as a sink, a radio, a table, a bench, a plurality of cabinets, a video game console or consoles, a computer, a media player, a digital receiver, and the like. Additionally, the appliances 30 described can be arrange in alternative arrangements without deviating from the spirit of the invention. Further, the absence or inclusion of the appliances 30 described in any combination is also contemplated.

In operation, a driver pulls the semi-tractor 12 off the road and places the semi-tractor in park. The driver then presses the actuation button 33 that drives one or more of the moveable walls 17 of the cab 16 to the expanded position along the rail system 355 by the actuation members 31. In the expanded position the interior of the cab 16 is expanded and allows for more room to use the various appliances 30 within the cab 16. For example, the driver and/or passenger can relieve themselves using the toilet 60. The driver can then use the shower 58 to take a warm shower using water from the heated water reservoir 72. After showering, the driver can then warm a meal that has been stored in the refrigerator 64 using the microwave 66.

After eating, the driver lifts the hatch door 32 using the latch 36. The driver than presses the release button 50 that removes the locking mechanism 48 from the spring 46 attached to the pair of hinges 38. The pair of hinges 38 are pulled open by the spring 46 and the bed 28 is unfolded and ready for you.

Alternatively, the driver rotates the restriction member 52 to release the bed or beds 28 that are hingedly connected to the rear wall 26. The beds 28 are then moved to a horizontal position and are ready for use.

Prior to sleeping the driver can watch the television 68. After resting, the driver then folds the bed 28 back up and places it within the hatch 34 and ensures that the locking mechanism 48 is in place to restrict the spring 46 from moving.

Alternatively, the driver lifts the hingedly connected bed 28 to a vertical position and rotates the restriction member 52 so that the vertical section 56 of the restriction member 52 prevents the bed 28 from moving.

The driver then ensures that the safety locks 78 are set on the refrigerator 64 and microwave 66 to prevent the devices from opening. The door 70 of the shower 58 is also secured to prevent it from opening while the semi-tractor 12 is in motion.

Further, the bed 28 and appliances 30 are mounted into position, which prevents the bed 28 and appliances 30 from moving during travel or becoming airborne in the event of an accident. Additionally, by being mounted the bed 28 and appliances 30 are able to move along with the moveable walls 17 of the cab 16 when transitioning from the retracted to expanded position, and vice versa.

After the appliances 30 are secured the driver presses the actuation button 33 and the actuation members 31 retract the moveable walls 17 to the retracted position. In the retracted position, the appliances 30 and bed 28 are positioned such that they do not interfere with one another to allow the cab 16 to return to a conventional size. In one embodiment, actuation button 33 initiates the storing of the bed 28 and the securing of the various appliances 30 within the cab 16 without human interaction.

Therefore, a semi-cab living quarters 10 has been provided that reduces down time during freight transport, maximizes cab space, increases safety, is durable, and is easy to use.

From the above discussion and accompanying figures and claims it will be appreciated that the semi-cab living quarters 10 offers many advantages over the prior art. It will be appreciated by those skilled in the art that other various modifications could be made to the device without parting from the spirit and scope of this invention. All such modifications and changes fall within the scope of the claims and are intended to be covered thereby. It should be understood that the examples and embodiments described herein are for illustrative purposes only and that various modifications or changes in the light thereof will be suggested to persons skilled in the art and are to be included within the spirit and purview of this application.

What is claimed is:

1. A semi-tractor cab living quarters comprising:
   a semi-tractor having a cab with a roof, a floor, a rear wall, a first side wall, and a second side wall;
   a plurality of actuating members connected to the rear wall and the first side wall such that the actuating member move the rear wall and the first side wall between a retracted position and an expanded position such that the first side wall moves outwardly away from the second sidewall and the rear wall moves outwardly and rearwardly from the cab.

2. The semi-tractor cab living quarters of claim 1 further comprising a plurality of appliances mounted within the cab.

3. The semi-tractor cab living quarters of claim 2 further comprising safety locks attached to the plurality of appliances.

4. The semi-tractor cab living quarters of claim 2 wherein the plurality of appliances includes a toilet.

5. The semi-tractor cab living quarters of claim 2 wherein the plurality of appliances includes a septic.

6. The semi-tractor cab living quarters of claim 2 wherein the plurality of appliances includes a refrigerator.

7. The semi-tractor cab living quarters of claim 2 wherein the plurality of appliances includes a shower.

8. A semi-tractor cab living quarters comprising:
   a semi-tractor having a cab with a roof, a floor, a rear wall, a first side wall, and a second side wall;
   a plurality of actuating members connected to the rear wall, the first side wall, and a second side wall such that the actuating members move the rear wall, the first side wall, and the second side wall between a retracted position and an expanded position such that the first side wall and second side wall move outwardly from the cab opposite of each other and the rear wall moves outwardly and rearwardly from the cab.

9. The semi-tractor cab living quarters of claim 8 further comprising at least one appliance mounted within the cab.

10. The semi-tractor cab living quarters of claim 8 further comprising an actuation button in communication with tat least one of the actuating members.

11. The semi-tractor cab living quarters of claim 8 further comprising a floor having a hatch disposed therein.

12. The semi-tractor cab living quarters of claim 11 further comprising a bed positioned in the hatch when stored.

13. A semi-tractor cab living quarters comprising:
    a semi-tractor having a cab with a roof, a floor, a rear wall, a first side wall, and a second side wall;
    a plurality of actuating members connected to the rear wall, the first side wall, and a second side wall such that the actuating members move the rear wall, the first side wall, and the second side wall between a retracted position and an expanded position such that the first side wall and second side wall move outwardly from the cab opposite of each other and the rear wall moves outwardly and rearwardly from the cab;
    an actuation button in communication with the plurality of actuating members.

14. The semi-tractor cab living quarters of claim 13 further comprising a plurality of appliances mounted within the cab.

15. The semi-tractor cab living quarters of claim 14 further comprising safety locks attached to the plurality of appliances.

16. The semi-tractor cab living quarters of claim 14 wherein the plurality of appliances includes a toilet.

17. The semi-tractor cab living quarters of claim 14 wherein the plurality of appliances includes a microwave.

18. The semi-tractor cab living quarters of claim 14 wherein the plurality of appliances includes a septic.

19. The semi-tractor cab living quarters of claim 14 wherein the plurality of appliances includes a refrigerator.

20. The semi-tractor cab living quarters of claim 14 wherein the plurality of appliances includes a shower.

* * * * *